May 15, 1956 — L. C. COTTS — 2,745,332
BASEBOARD HEAT DISTRIBUTOR
Filed April 28, 1951 — 2 Sheets-Sheet 1
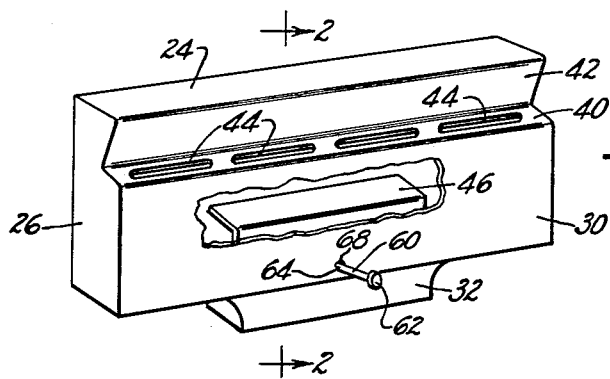
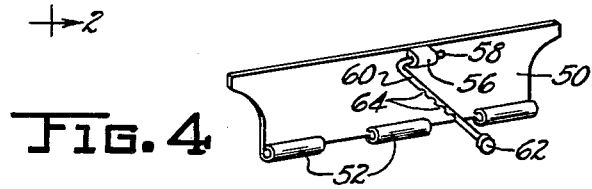
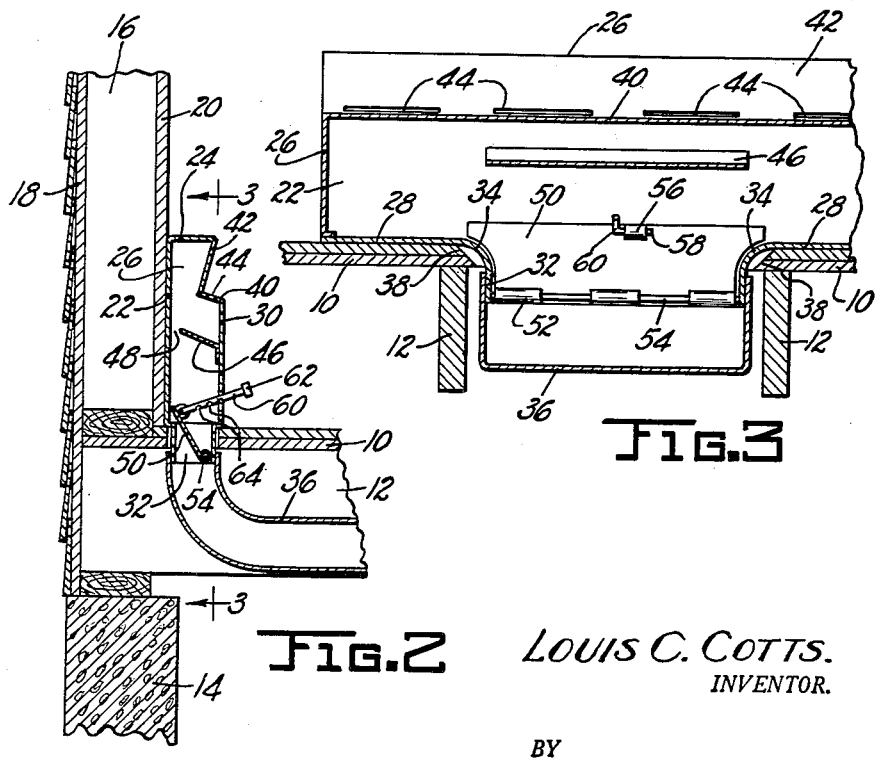
Louis C. Cotts.
INVENTOR.
BY Oltsch & Knoblock
ATTORNEYS May 15, 1956 L. C. COTTS 2,745,332
BASEBOARD HEAT DISTRIBUTOR
Filed April 28, 1951 2 Sheets—Sheet 2
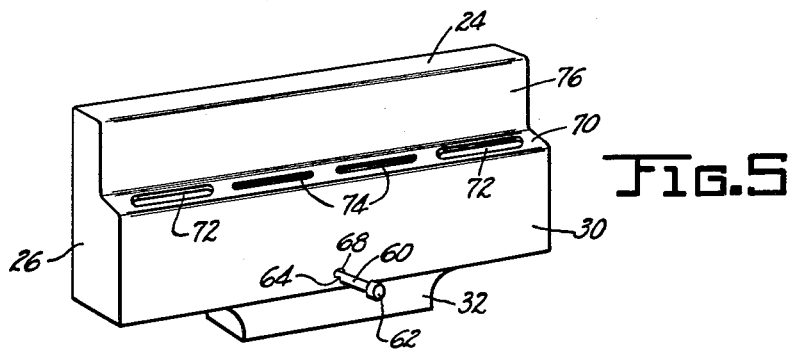
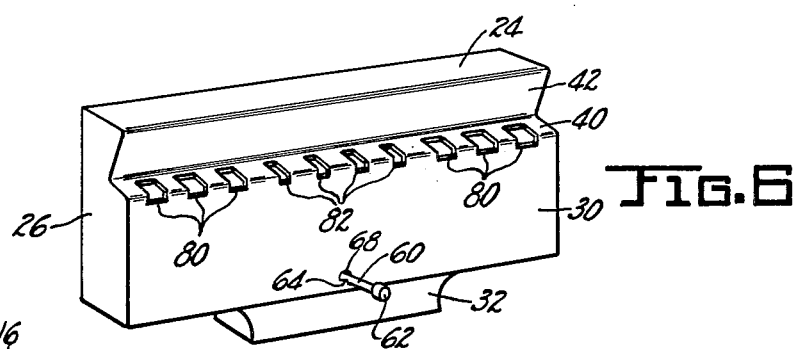
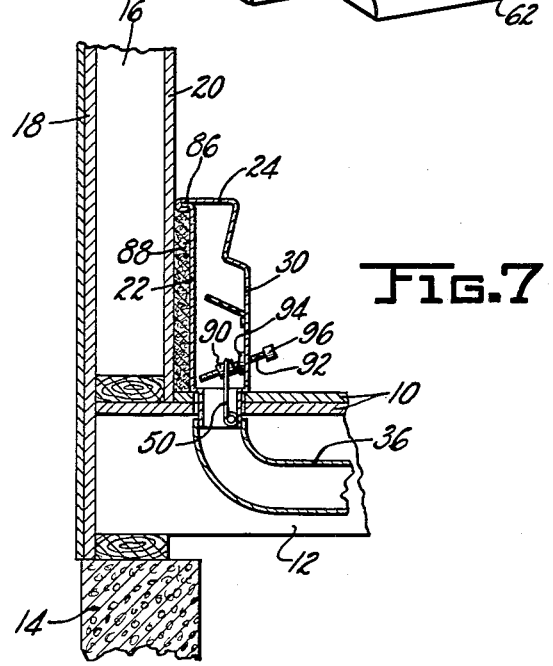
LOUIS C. COTTS.
INVENTOR.
BY Oltsch & Knoblock
ATTORNEYS United States Patent Office 2,745,332
Patented May 15, 1956

2,745,332

BASEBOARD HEAT DISTRIBUTOR

Louis C. Cotts, Michigan City, Ind.

Application April 28, 1951, Serial No. 223,580

7 Claims. (Cl. 98—40)

This invention relates to a baseboard heat distributor and is particularly adapted for use with forced warm air heating systems.

The primary object of the invention is to provide a device for delivering heated air from a warm air heating system, which is particularly adapted to be disposed at an outer wall of a building for use in distributing heated air along the inner surface of said wall and throughout the room space in a manner to provide a very comfortable and effective heating action without creating excessive air movements and without creating uncomfortable drafts, and in a manner so as to apply along the inner surface of the wall at which the unit is mounted, a blanket of warm air to counteract the infiltration of cold air from atmosphere, but in such a manner as to substantially avoid direct impingement of the air blanket against the surface of the wall.

A further object is to provide a device of this character which will direct heated air upward and adjacent to a building wall at a velocity and in a direction selected to minimize the direct impingement of the heated air stream upon a person occupying the room in which the device is located.

A further object is to provide a device so constructed that, when connected with a forced warm air type of heating system, it develops and utilizes therein a definite static pressure of the warm air so that a plurality of such devices will permit heat delivery from the heating system at any point selected and in any proportion chosen.

A further object is to provide a device of this character which is so constructed that it may be adjusted to supply a sufficient quantity of heated air to balance heat losses in the room.

A further object is to provide a device of this character which has a large surface area heated by the air passing therethrough and thus serving to distribute radiant heat from its surface in addition to the distribution of heat by means of convected air currents discharged therefrom.

A further object is to provide a device of this character within which heated air is received and within which a predetermined pressure is maintained, and wherein a uniform discharge of heated air occurs throughout its length at points including discharge outlets remotely spaced from the hot air intake of the device.

A further object is to provide a device of this character in the nature of an elongated container having restricted air outlets along its length and an air inlet of lesser cross-sectional area than said container but of substantially greater effective cross-sectional area than the total effective area of the outlet passages, wherein said device is so constructed as to insure a non-restricting delivery of air under pressure to the device without occurrence of air noise.

A further object is to provide a device of this character including an elongated chamber having outlets disposed along its length at its upper portion and an inlet communicating with a portion only of the bottom of the container, wherein the device is so constructed that the hot air discharged at the outlets along its full length will be substantially uniform or equal.

Other objects will be apparent from the following specification.

In the drawing:

Fig. 1 is a perspective view of the device constituting one embodiment of my invention with parts broken away.

Fig. 2 is a vertical transverse sectional view taken on line 2—2 of Fig. 1, and illustrating the arrangement of the device when installed in a room.

Fig. 3 is a vertical longitudinal sectional view taken on line 3—3 of Fig. 2.

Fig. 4 is a perspective view illustrating a damper employed in the device.

Fig. 5 is a perspective view illustrating a modified embodiment of the invention.

Fig. 6 is a perspective view illustrating a second modified embodiment of the invention.

Fig. 7 is a sectional view similar to Fig. 2, illustrating another modified embodiment of the invention.

Referring to the drawings which illustrate the preferred embodiments of the invention, and particularly to Figs. 1 to 4, the numeral 10 designates the floor of a building which is supported upon joists 12, which in turn are supported upon a foundation or other supporting structure 14. The outer wall of the building is illustrated, the same being built upon studs 16 including an outer sheath 18 constituting siding or the like, and the inner sheath 20 preferably constituting plaster, wallboard or the like.

My improved device is adapted to be installed in the building along the base of the outer wall thereof and positioned to rest upon the surface of the floor 10. In the embodiment of the device illustrated in Figs. 1 to 4, the device comprises a chamber which may be formed of any suitable material although I prefer to employ metal. The device has a flat upright rear wall 22, a top wall 24, end walls 26, a bottom wall 28 and a front wall 30, said walls being so interconnected as to define a container or chamber, closed except for the openings which will be described. An inlet neck portion 32 is carried by the chambered member, preferably in depending relation thereto and preferably is substantially centered longitudinally thereof. The neck portion is of restricted horizontal cross-sectional area as compared to the horizontal cross-sectional area of the main body of the chamber. The principal restriction occurs in a direction parallel to the length of the chamber although, as illustrated in Fig. 2, the inlet neck 32 may also be of restricted width or depth. The neck is flared at 34 at its junction with a wall at the lower part of the device. The neck 32 projects from the device a distance sufficient to provide the flaring portion 34 of desired radius which will permit a streamline flow of air therethrough and expansion of air under the delivery pressure at which the fan (not shown) of the heating system operates, said air being delivered through a duct 36 connected with the furnace. The duct will be of any size and character found suitable and preferably will be of a width narrower than the usual spacing of the studs 16 or joists 12. The manner of installation of the device is best illustrated in Figs. 2 and 3, and particularly in Fig. 3, wherein it will be seen that an opening is cut in the floor between joists 12 to receive the neck 32, said opening preferably being beveled at 38 to permit the flare portion 34 to pass freely therethrough.

The front upper portion of the device is preferably configurated as by bending of the front wall 30 thereof. As illustrated in Figs. 1 and 2, the lower portion of the front wall 30 preferably extends substantially vertical, that is, parallel to the rear wall 22 for the major portion of its height. In spaced relation to the top 26, the wall 30 has a rearwardly inwardly offset portion 40 formed therein, and the upper terminal portion of the front wall constitutes a forwardly upwardly inclined panel portion 42. Outlet or discharge openings 44 are formed at the shoulder or inset portion 40. The openings 44 may take any shape and be of any size found suitable and, as here illustrated, constitute a plurality of openings substantially equally spaced and extending lengthwise of the device approximately midwidth of the shoulder portion 40. The inclination of the portion 42 will preferably be such that its upper end is positioned above and may partially or wholly overlie or overhang the openings 44. When positioned as shown in Fig. 2, the panel portion 42 will serve to deflect inwardly air currents discharged in an upward direction through the openings 44. The arrangement is preferably such that a blanket of heated air is discharged upwardly through the openings 44 into the room or space in which the device is located and tends to pass along the inner face 20 of the wall but preferably is held slightly spaced therefrom or prevented from direct impingement by the overhanging or deflecting surface 42.

The devices may be formed in any of a wide range of sizes and dimensions although the dimensions will differ principally as to length. As an example of dimensions, I contemplate that the unit may be of a height in the order of eight inches, although it can be of a dimension as low as three inches and may be taller than eight inches. The width or thickness of the item from front to back will preferably be in the range of from two inches or even less to three inches or more. The length of the unit may vary widely, and I contemplate that it may be of dimensions from 20 inches to eight feet or even more.

In instances where the unit is of substantial length so that heated air entering the unit must travel upwardly and longitudinally from the inlet 32 in order to reach the outermost outlet openings 44, it may become desirable to provide means to secure substantially uniform rate of discharge of heated air from all of the discharge openings. Various means may be provided to accomplish this end, and in Figs. 1 to 4 I have illustrated the provision of a baffle plate 46 positioned above the inlet 32 and spanning a substantial portion of the width of the device so as to provide a restriction at 48 retarding the upward flow of heated air to the outlet directly above the inlet, intending thereby to interpose a balancing factor which governs the discharge of air and facilitates the discharge of as much air at the outermost or endmost openings 44 as is discharged in the center opening 44 directly above the inlet neck 32. Other means for accomplishing a similar balance are illustrated and will be described hereinafter.

Any selected number of units may be connected to a warm air furnace by means of the conduits 36, and it is desired that each individual unit shall be controllable selectively or individually to regulate the amount of heated air discharged therefrom. I propose to employ an adjustable damper for this purpose. One such damper is illustrated in Fig. 4 and comprises a plate 50 having hinge portions 52 at one end thereof and adapted to be hinged by a rod 54 spanning the neck 32 at the inlet end thereof. The plate 50 is preferably of upwardly flaring shape so proportioned that when it is positioned as illustrated in Fig. 2, the upper large end thereof will project into the flaring portion 34 of the neck and conform therewith when in closed position substantially spanning the inlet transversely as seen in Fig. 2. It will be apparent that as the damper is swung upwardly toward the right, as viewed in Fig. 1, toward an open position, the enlarged upper end portion of the damper will have adequate clearance within the interior of the device. Any suitable means may be employed to adjust the position of the device. The means here employed constitutes a journal portion 56 carried by the damper plate and journaling the end portion 58 of a rod 60 having a knob 62 at its outer end and having a plurality of longitudinally spaced notches 64. The rod 60 will be of a length to extend through an opening 68 formed in the front wall 30 of the device. The notches will be adapted to engage the wall 30 at the bottom of the notch or opening 68, thereby to hold the damper in a selected angular adjustment.

In use the devices are connected to a warm air heating system having an air-circulating capacity sufficient to develop in each of the units connected thereto a positive pressure. The pressure may vary widely but preferably should not greatly exceed a static pressure of three-eighths of an inch of water in each of the distributors or heads. Any positive pressure desired may be used, the pressure employed determining in part the volumetric rate of discharge of heated air from each distributor. The pressure will, of course, be substantially greater in the feed lines 36 than in the distributor units because of the smaller cross-sectional area thereof. The air within the lines 36 will thus travel at a higher velocity in the lines 36 than in the chamber or distributor heads, and the flare at 34 at the junction of the neck 32 with the head must be such as to insure against any whistling or noise occurring incident to the entrance of air into the distributing head past the damper 50 when the same is used, or past the baffle 46 when a baffle is used.

It will be noted that the level at which the discharge outlets 44 are placed is spaced below the level of the top panel 24. This positioning of the parts, coupled with the restriction of the total effective area of the outlet openings 44, as compared to the effective cross-sectional area of the inlet conduit 36, acts to maintain the static pressure and to increase the storage capacity of the heated air. "Effective area," as above mentioned, refers to the flow-accommodating capacity of the openings, and takes into account any flow retardation factors, such as friction due to size or shape. This provides uniformity of operation.

Another advantage of the positioning of the outlet openings intermediate the height of the distributor is to facilitate the lateral distribution of the heated air throughout the whole unit and to assist in equalizing the rate of discharge of heated air at all discharge openings 44.

Still another advantage of the construction has been explained before and constitutes the guiding or deflection of the air discharged from the outlet openings 44 to prevent or at least reduce the tendency of the heated air to impinge upon and travel upwardly along the inner surface of the wall 20 above the distributor head. At the same time the elongated arrangement of the discharge openings does provide a substantially continuous blanket or stream of heated air of a width substantially equal to the length of the distributor and which flows or moves upwardly near the surface of the wall and forms a barrier to the entry of cold air into the room through the building wall.

The invention may be embodied in many alternative forms. Several alternative embodiments have been illustrated and will be described briefly. In the embodiment of Fig. 5 the front wall 30 is substantially stepped to provide a shoulder portion 70 spaced below the top wall 24 of the distributor, said shoulder having the heat outlets 72 and 74 formed therein. The uppermost portion 76 of the front wall of the distributor above the shoulder 70 may be substantially upright. The openings 74 positioned at the center of the unit will preferably be of lesser size or area than the openings 72 adjacent the ends thereof. It is contemplated that by this arrangement the use of the baffle 46 may be omitted and the difference in the size of the discharge openings utilized as a means for securing substantial equality of rate of discharge of the heated air through each of the discharge openings. In this embodiment also the shoulder 70 may be positioned at a lower level in the overall height of the unit than the location of the shoulder 40 in the embodiment shown in Fig. 1, and the resultant vertical elongation of the front wall portion 76 may serve as a means to direct air upwardly in a path adjacent to but spaced from the surface of the wall 20 above the distributor.

Another embodiment of the invention is illustrated in Fig. 6. In this embodiment the distributor head is of substantially the same outline or shape as illustrated in Fig. 1 and the same reference numerals are applied. The discharge openings are different, however, and constitute openings 80 and 82, the openings 82 being located in the longitudinal central portion of the device, and the openings 80 being located adjacent the ends. The openings 80 are of larger area than the openings 82 or, if of the same size as openings 82, may be located closer together. The openings will preferably be formed partly in the shoulder 40 and partly in the front wall 30, although they may be formed wholly in the shoulder 40. The difference in size and in spacing of the openings 80 and 82 in this embodiment serves as a means to balance the distribution of heat and insure that the rate of discharge of heated air from the end portions of the distributor is substantially equal to the rate of discharge of heated air from the central portion. By this arrangement it is also contemplated that balance baffles of the character of the baffle 46 of Fig. 1 may be omitted.

Another alternative embodiment of the invention is illustrated in Fig. 7. In this construction the distributor head is provided at the margin of its top wall 24 and end walls 26 with rearwardly projecting flanges 86 defining a pocket. This pocket may be employed to receive a panel of heat-insulating material 88 which protects the structure from the occurrence of excessive heat within the distributor. Fig. 7 illustrates another modification with respect to the adjustment of the damper 50. In this construction the damper 50 will pivotally carry an internally screw-threaded member 90 adapted to receive a screw-threaded rod 92 journaled at 94 in the front wall 30 of the distributor and provided with an operating head or knob 96 at its outer end. If desired, a journal similar to 94 may be provided at the rear end of the unit. The parts will preferably be so arranged that the rod 92 will extend at a tangent to the damper 50 at an intermediate or partly open position thereof and thereby will accommodate, upon rotation of the shaft in one direction or the other, either the substantially complete closing or substantially complete opening of that damper from the intermediate position.

Each of these alternative embodiments possesses substantially the same advantages and operates upon the same principle as the preferred embodiment discussed hereinabove.

It will be understood that other embodiments and changes in the construction of the device may be made within the scope of the appended claims without departing from the spirit of the invention.

I claim:

1. An air distributor adapted to be mounted at the lower part of a building wall for connection with a discharge duct of a forced air circulating device, comprising front, back, top, bottom and end walls defining a horizontally elongated chamber, one of said walls having an inlet opening, the upper portion of said front wall being inwardly offset to provide a longitudinal shoulder portion spaced from said top and bottom walls and defining a lower chamber portion and an upper chamber portion, and an air discharge outlet from said lower chamber formed in said shoulder to extend longitudinally thereof and face upwardly to discharge air upwardly along the outer surface of the upper portion of said front wall, said outlet constituting at least one opening, the walls at said upper chamber portion being substantially imperforate and said upper and lower chamber portions being in open communication throughout the length of the chamber, whereby the air discharged from said outlet will be directed upwardly and along the building wall to form a curtain parallel to said wall.

2. An air distributor adapted to be mounted at the lower part of a building wall for connection with a discharge duct of a forced air circulating device, comprising front, back, top, bottom and end walls defining a horizontally elongated chamber, said front wall being laterally inwardly offset to define a longitudinal shoulder portion intermediate its height and a reduced substantially imperforate upper chamber, and an air discharge outlet extending longitudinally in said lateral shoulder portion and facing upwardly and constituting at least one opening, said front wall being imperforate and forwardly upwardly inclined from the rear of said shoulder portion to the front upper portion of said top to overlie at least a part of said discharge outlet whereby the discharged air will impinge against the upper part of said front wall to form a blanket along said building wall above said distributor.

3. An air distributor as defined in claim 2, wherein said outlet constitutes a plurality of openings, the openings adjacent its ends are larger than the intermediate openings whereby air is diverted longitudinally in said chamber from said duct and is discharged in substantially uniform concentration along its length.

4. An air distributor as defined in claim 2, wherein said outlet constitutes a plurality of longitudinally spaced apertures whose spacing is greatest and whose area is least adjacent to said duct whereby air is uniformly distributed in said chamber and substantially uniformly discharged along its length.

5. An air distributor as defined in claim 2, wherein said chamber has a rear wall inset from the rear edges of said top and end walls to define a pocket, and heat insulating material fitting in said pocket.

6. An air distributor for connection with a discharge duct of a forced air circulating device, comprising front, rear, top, bottom and end walls defining a chamber, one of said walls having an inlet opening, said front wall including a longitudinal rearwardly and inwardly extending shoulder portion intermediate its height, said chamber having outlet means extending substantially full length thereof in said shoulder, the portion of said front wall above the level of said shoulder being inset from the portion thereof below said shoulder, being substantially imperforate, and being spaced from said rear wall to define a chamber portion above the level of said outlet means, said outlet means discharging air upwardly and along the outer face of the portion of said front wall above said shoulder whereby the air impinges against said upper front wall portion to be directed upwardly in a blanket above said distributor.

7. An air distributor adapted to be mounted at the lower part of a building wall for connection with a discharge duct of a forced air circulating device, comprising a horizontally elongated hollow chamber having end closures, inlet means between said closures, said chamber having a lower front wall portion and an upper front wall portion located in rearwardly spaced relation to said lower front wall portion, said upper and lower front wall portions being substantially uniform longitudinally and a discharge portion between adjacent ends of said front wall portions and spanning the space therebetween to extend substantially the full length of said chamber and arranged to discharge air upwardly alongside the outer surface of said upper front wall portion and alongside said building wall above said chamber, said upper front wall portion being substantially imperforate and at least a portion thereof being inclined downwardly and inwardly and overlying at least a portion of said discharge portion.

References Cited in the file of this patent

UNITED STATES PATENTS

| | | |
|---|---|---|
| 426,552 | Smead | Apr. 29, 1890 |
| 780,247 | Wilcox | Jan. 17, 1905 |
| 1,296,394 | Hubbard | Mar. 4, 1919 |
| 2,139,775 | Simoneau | Dec. 13, 1938 |
| 2,205,744 | Conrad | June 25, 1940 |
| 2,237,831 | Jones | Apr. 8, 1941 |
| 2,250,330 | Eastwood et al. | July 22, 1941 |
| 2,284,912 | Maynard et al. | June 2, 1942 |
| 2,483,704 | Leigh | Oct. 4, 1949 |
| 2,567,789 | Sawyer | Sept. 11, 1951 |
| 2,585,703 | Thorson | Feb. 12, 1952 |

FOREIGN PATENTS

| | | |
|---|---|---|
| 1,737 | Great Britain | 1899 |
| 525,222 | Great Britain | Aug. 23, 1940 |